United States Patent Office 3,490,958
Patented Jan. 20, 1970

3,490,958
HALOCARBON-METAL OXIDE COMBINATIONS IN HEAT TREATMENT OF METALS
John W. Robinson, Jr., Gradyville, Pa., assignor to E. I. du Pont de Nemours and Company, Wilmington, Del., a corporation of Delaware
No Drawing. Filed Apr. 13, 1966, Ser. No. 542,206
Int. Cl. C21d 1/74, 1/76
U.S. Cl. 148—13.1   8 Claims

ABSTRACT OF THE DISCLOSURE

A reduction of oxide formations during heat treatment of metal is accomplished by heating the metal in a gaseous atmosphere containing a hydrogen halide resulting from the decomposition of a halogenated hydrocarbon and the excess hydrogen halide gas is scavenged with particles of an oxide, hydroxide or carbonate of magnesium, calcium, strontium or barium.

---

This invention relates to the heat treatment of metals and metal alloys. It is more particularly directed to an improvement in the method for controlling oxide formation on solid metal surfaces during heat treatment which is disclosed and claimed in U.S. application Ser. No. 542,217 of Eugene P. Kirwan and John W. Robinson, Jr., filed simultaneously herewith on Apr. 13, 1966 and now abandoned.

According to the method of application Ser. No. 542,217, oxide formation on metal surfaces during heat treatment can be inhibited or prevented by conducting the treatment in a gaseous atmosphere containing the gaseous decomposition products of at least one halogenated hydrocarbon. These decomposition products react with, or "getter," oxygen and water vapor, thereby preventing oxidation of the hot metal by these gases. In some cases the method permits elimination of pickling or mechanical cleaning operations subsequent to the heat treatment.

A problem encountered in practice of this method is that hydrogen halide gas (HF and/or HCl) is produced in substantial quantities, either directly upon decomposition of the halogenated hydrocarbon or by hydrolysis of the decomposition products or both. These gases are objectionable because they are acrid-smelling and cause irritation to mucous membranes.

According to the present invention this problem of fume evolution is obviated or alleviated. The hydrogen halide gas produced is scavenged by causing it to react with a scavenger material which is a metal oxide having a lesser free energy of formation than the corresponding metal fluoride or chloride. Such a metal oxide will react with the hydrogen fluoride or chloride evolved to form a metal halide which is more stable than the oxide.

Examples of oxides which can be used include the oxides of nickel, zinc, copper, cobalt, chromium, titanium, zirconium, silicon, cadmium, thorium, the alkali metals, and the alkaline earth metals. Precursors of such oxides, that is, metal compounds which decompose upon heating to form the oxides, can also be used. Examples of suitable precursors are the hydroxides, nitrates, carbonates, basic carbonates, and acid carbonates. Of these, the carbonates are preferred because their decomposition products do not include water, elemental oxygen, or nitrogen. However, the carbonates do decompose to provide $CO_2$, which in some instances can be oxidizing to hot metals, so it is ordinarily preferred to use the oxides themselves. Mixtures of oxides, mixtures of precursors, and mixtures of oxides and precursors can of course also be used. In the description which follows the oxides and oxide precursors will be referred to as "scavengers."

It should be observed that in the case of certain of the metals listed above, e.g. thorium and chromium, the free energy of formation of the oxide will be less than the free energy of formation of the fluoride but greater than the free energy of formation of the chloride. In these cases, of course, the oxides will not be used with chlorine-substituted materials because they will not be effective for scavenging HCl. However, they will scavenge HF and thus can be used in conjunction with fluorine-containing materials such as polytetrafluoroethylene.

As described in application Ser. No. 542,217, referred to above, the halogenated hydrocarbons which can be used are chlorine-substituted, fluorine-substituted, and fluorine- and chlorine-substituted aliphatic hydrocarbons, including halogenated alkanes as well as monomeric and polymeric forms of halogenated alkenes. In the description which follows these halogenated hydrocarbons will be referred to as "halocarbons." The halocarbons which can be used include gases, liquids, and solids.

Among the solid halocarbons which can be used according to this invention are the common halogenated hydrocarbon polymers or telomers where the halogen is fluorine and/or chlorine. Since the polymers are decomposed in use neither the carbon chain length in the polymer unit nor the degree of polymerization is in any way critical. Ordinarily the polymers used will be homopolymers of ethylenically unsaturated aliphatic hydrocarbon monomers containing 2 to about 10, preferably 2 to 4, carbon atoms, each monomer being substituted by at least one atom and preferably at least two atoms selected from the group consisting of fluorine and chlorine. There can also be used interpolymers of these monomers with each other and interpolymers of these monomers with ethylenically unsaturated aliphatic hydrocarbon monomers containing 2 to about 10, preferably 2 to 4, carbon atoms.

The preferred halocarbons used according to this invention are the fluorinated hydrocarbon polymers or telomers. These include, for example, polytetrafluoroethylene, polychlorotrifluoroethylene, polyvinylidene fluoride, polyhexafluoropropylene, and copolymers of vinylidenefluoride and tetrafluoroethylene with hexafluoropropylene. Mixtures of polymers can also be used.

The substituted alkanes and monomeric substituted alkenes are in general aliphatic hydrocarbons containing from 1 to about 10, preferably 2 to 4 carbon atoms, and being substituted by at least 1 atom, preferably at least 2 atoms, selected from chlorine and fluorine. Examples of suitable gaseous materials include 1,1-difluoroethane, 1,1,1-chlorodifluoroethane, 1-fluoroethylene, 1,1-difluoroethylene, carbon tetrafluoride, fluoroform, chlorodifluoromethane, fluorodichloromethane, chlorotrifluoromethane, fluorotrichloromethane, dichlorodifluoromethane, hexafluoroethane, 1-chloro-1,1,2,2,2-pentafluoroethane, and 1,2-dichloro-1,1,2,2-tetrafluoroethane. Examples of suitable liquid materials include carbon tetrachloride, chloroform, 1-fluoro-1,2,2-trichloroethylene, 1,1,2,2-tetrachloro-1,2-difluoroethane. Suitable solid materials include hexachloroethane and octachloropropane.

There are several methods available for carrying out the present invention. The best mode presently contemplated involves use of a halocarbon which decomposes without prior vaporization at the temperature of the heat treatmnet in conjunction with a scavenger which is solid and which forms a solid halide at the same temperature. Polytetrafluoroethylene is an example of such a halocarbon and calcium and magnesium oxides are examples of such a scavenger.

The halocarbon and scavenger are merely placed in the furnace prior to commencement of the heat treating. Ordinarily it is not necessary to add additional halocarbon or scavenger to the furnace during the heat treatment, although this can be done if desired.

In this mode of carrying out the invention the halocarbon and scavenger are preferably placed in close proximity to each other within the furnace. Desirably, the halocarbon and scavenger are added as a molded object in which the scavenger is present as finely divided particles and in which the halocarbon is present either in the form of discrete particles or as a matrix. Alternatively, the halocarbon and scavenger may be added as a powder mixture of finely divided particles of each. The former mode is ordinarily preferred because the smaller surface to volume ratio of a relatively large molded object provides more gradual decomposition of the halocarbon.

Molded objects, such as pellets and doughnut-shaped rings suitable for use in the invention can be obtained by conventional procedures involving compacting, under pressures of 1000 to 60,000 p.s.i., powder mixtures of halocarbon and scavenger particles. The compacting step can be followed by a sintering step to provide a stronger body. If the proportion of halocarbon in the object is low, compression and sintering may not provide a sufficiently strong body and it may thus be desirable to include in the powder mix a binder such as sodium silicate solution. The mix can then be molded, compressed and dried to provide solid articles of sufficient strength for convenient use.

Scavengers which are solid at the tempreature of the heat treatment should be used in finely divided particulate form such as can be obtained by grinding or milling. Effectiveness of these materials in scavenging HF and HCl appears to be related to the extent of their surface area. For example, magnesium carbonate prepared by precipitation methods and having a surface area as determined by standard nitrogen adsorption techniques on the order of 40–50 $m.^2/g.$ is many times more effective than dead-burned magnesia having a surface area of say 0.5–1 $m.^2/g.$ Dead-burned magnesia is magnesium oxide which has been heated to a high temperature so that it will not hydrate readily. In general, then, the surface area of the scavenger should be greater than about 0.1 $m.^2/g.$ and is preferably greater than 2 $m.^2/g.$, even more preferably greater than 5 $m.^2/g.$ There is of course no upper limit on the surface area of the scavenger as far as suitability for use in this invention is concerned. However, the expense of preparing materials with surface area greater than about 200 $m.^2/g.$ is not ordinarily justified by the increase in effectiveness. Materials prepared by ordinary precipitation methods and having surface areas between about 10 and 150 $m.^2/g.$ are inexpensive and are entirely suitable for use in the process.

Possible alternative methods of practicing the invention will be mentioned briefly.

A halocarbon which is a gas or liquid at room temperature may be introduced through an inlet port into the furnace prior to and/or during the heating cycle. In this case a bed of solid scavenger placed at any point within the furnace will provide scavenging of hydrogen halide produced upon decomposition and hydrolysis of the halocarbon, due to natural circulation within the furnace. For more effective scavenging, however, the scavenger material should be one which is a vapor at the temperature of the heat treatment (e.g. the alkali metal oxides) or, if it is a solid or liquid at the temperature of the theat treatment, an atomized stream of the material should be directed so as to impinge on the stream of halocarbon at a point very near the point where the halocarbon is introduced. If desired, a very finely divided scavenger material can be suspended in a gaseous or liquid halocarbon stream and the halocarbon and scavenger can be introduced simultaneously.

As a further alternative, a gaseous or liquid halocarbon can be mixed with an absorbent material such as a clay. The clay containing absorbed halocarbon can then be mixed with particulate scavenger material and the mixture can be molded to provide a solid article which can be used in the same manner as the solid halocarbon articles.

Where a furnace having a forced circulation atmosphere is used, a bed of solid particulate scavenger material can be placed at the exit port so that the hydrogen halide is scrubbed from the furnace atmosphere.

Additional alternative modes of practicing the invention will doubtless be apparent to those skilled in the art.

The term "heat treatment" is ordinarily used to designate heating and cooling of solid metals or alloys to obtain desired conditions. This includes such operations as stress relieving, solution treating, annealing, hardening, precipitation hardening, tempering, and homogenizing of ferrous and non-ferrous metals, and austenitizing and normalizing of ferrous metals. The term is not ordinarily applied to heating for the sole purpose of hot working. See Metals Handbook, vol. 1, 8th ed., p. 20 (1961). However, as used herein the term is intended to include any heating of metal during processing where surface oxide formation can create difficulties, including heating prior to hot working.

Ordinarily heat treatment of metals utilizing the improved method of this invention will be carried out in an atmosphere of air or in the combustion products of a hydrocarbon fuel. The principal advantage of the method is that no special atmosphere is required for the heat treatment. However, special atmospheres can be used in conjunction with this invention if desired. Furnace atmospheres used in heat treatment of metals are discussed in Metals Handbook, vol. 2, 8th ed., pp. 67–84 (1964). Thus, the method can be used where the treatment is conducted in an atmosphere selected from air, hydrogen, nitrogen, argon, helium, exothermic base, prepared nitrogen base, endothermic base, charcoal base, exothermic-endothermic base, and ammonia base atmospheres.

Temperature of the heat treatment will ordinarily be sufficiently high to decompose the halocarbon. This of course depends upon the particular halocarbon used and the purpose for which the treatment is being performed. If the temperature of the treatment is insufficient to decompose the halocarbon used, a separate decomposition chamber maintained at a higher temperature can be provided.

Iron and all iron alloys as well as all non-ferrous metals and metal alloys can be treated according to the method of this invention. Non-ferrous metals and alloys which can be treated include copper, aluminum, magnesium, chromium, zinc, nickel, tin, lead, titanium, tungsten, molybdenum, cobalt, tantalum, and columbium, and their alloys.

Many variables will affect the amounts of halocarbon and scavenger materials used. The proper amount of halocarbon to be used will depend among other things upon the particular metal being treated, the extent of oxidation inhibition desired, the oxygen (or other oxidizing gas) concentration in the furnace atmosphere, the size of the furnace, and, of course, the particular halocarbon used. The amount of scavenger will depend, among other things, upon the extent of reduction in hydrogen halide concentration desired, the particular halocarbon used, the moisture content of the atmosphere, the nature of the scavenger, whether solid, liquid, or gaseous at the temperature of the heat treatment, and the surface area of solid scavenger. In view of all these variables it will be apparent that the amounts and proportions can vary widely and that precise figures which would be valid under all conditions can not be stated.

In general, however, the amount of halocarbon used should be sufficient to provide an atmosphere inside the furnace containing less than about 500 parts per million, preferably less than 200 parts per million and even more preferably less than 100 parts per million, of free oxygen.

In order to determine whether sufficient halogenated hydrocarbon has been added the furnace atmosphere can be sampled and analyzed by gas chromatography for oxygen content. When the oxygen concentration begins to increase to a value outside the range specified additional halogenated hydrocarbon can be added to the furnace.

It is ordinarily desirable to use enough halogenated hydrocarbon that some material remains at the end of the heating cycle. In this event the material will continue to decompose during at least a portion of the cooling period, thereby providing a slight positive pressure inside the furnace and preventing leakage of air into the furnace. It may also be found advantageous to bleed a slight positive pressure of nitrogen (say 1" of $H_2O$) into the closed heat treating chamber during the cooling cycle to prevent air leakage into the furnace. This prevents oxidation during the cooling cycle. This procedure has been found particularly effective in heat treatment of copper alloys where the heating and cooling are both ordinarily carried out with the metal inside a muffle which is not closed with an entirely gas-impremeable seal.

Sufficient scavenger should of course be used to provide a substantial reduction of hydrogen halide concentration in the furnace atmosphere. In general the ratio of scavenger to halocarbon should be in the range of about 1:10 to 10:1 by weight, the preferred range being 1:5 to 5:1, and even more preferred range being 1:1 to 3:1. Expressed differently, the amount of scavenger should be sufficient to provide an atmosphere in the furnace containing less than 500 parts per million, preferably less than 100 parts per million, hydrogen halide gas.

In many cases, of course sampling of the furnace atmosphere during heat treatment to determine oxygen and/or hydrogen halide content will not be convenient. In this event, the amounts of the materials to be introduced into the furnace prior to starting the heat treatment to provide a given result can be easily determined by routine experimentation. In general, use of more halocarbon and/or scavenger than is required produces no harmful result, and the upper limit on amounts of these materials will be determined only by cost consideration.

The invention will be further described by reference to the following illustrative examples.

Example 1

An intimate mixture of 55 weight percent MgO powder and 45 weight percent polytetrafluoroethylene (TFE) powder is prepared. The TFE powder is a material prepared by coagulation of a colloidal dispersion of the polymer. The polymer particles range in size from about 300 to 600 microns with an average size of about 500 microns. The MgO is USP light powder with a nitrogen surface area of 33 $m.^2/g$.

The mixture is placed in a die and subjected to a pressure of 3000 p.s.i. to form an annular ring with an O.D. of 3½", an I.D. of 1¾" and an axial length of 12". After compaction the ring is sintered at 730° F. for one-half hour to form a solid piece composed of a matrix of TFE and containing discrete MgO particles uniformly distributed throughout.

The annular ring is next cut into a series of doughnut-shaped rings each 1" thick and weighing ½ #.

Four of these rings are placed into a chamber which has a total volume of 39 cu. ft., along with a piece of 440-a stainless steel which is ½" thick, 12" wide and 3' long. The entire chamber is covered with a bell-type cover and placed into a gas-fired oven. The temperature is raised to 1850° F. and held there for 45 minutes. The chamber and its contents are then allowed to cool slowly to room temperature.

Upon opening the chamber only a slight odor of hydrogen fluoride gas is noticeable. The surface of the steel shows little or no effects of oxidation.

Example 2

Into a chamber of 75 cu. ft. volume is placed 2000 pounds of low residual phosphorous deoxidized copper in the form of coiled strip 24" and $\frac{1}{16}$" thick. In this same chamber are placed two of the ½ # doughnut-shaped rings used in Example 1. A bell-type cover is placed over the chamber and the entire system is heated radiantly to 1200° F. and held for a period of two hours. The chamber and its contents are then allowed to cool to room temperature, then the cover is removed. Very little odor of HF is noticeable upon opening the chamber. The annealed copper is free of any traces of oxide.

Example 3

Into a stainless steel container is placed two tons of phosphor-bronze of nominal composition 95% copper and 5% tin. The alloy is in the form of coils 12" in width and ¼" thick. An intimate mixture of one pound of polychlorotrifluoroethylene powder and two pounds of $Ca(OH)_2$ powder is spread around the interior of the container. Surface area of the $Ca(OH)_2$ used is 16 $m.^2/g$. as determined by the nitrogen adsorption technique. The container is closed and the entire assembly is placed into a gas-fired furnace and brought to a temperature of 1300° F. and held at this temperature for 1½ hours.

The assembly is then cooled to room temperature over a period of 6 hours. The cover of the container is removed. No odor of HCl or HF is discernible. No sign of normally present black oxide of copper is present on the surface of the alloy and the coils are subjected to cold rolling without prior pickling in acid.

Substantially identical results are obtained when this example is repeated using a copolymer of tetrafluoroethylene with hexafluoropropylene in place of the polychlorotrifluoroethylene.

Example 4

One ton of nickel silver alloy containing 65% copper, 18% nickel, and 17% zinc is placed in a stainless steel container. The nickel silver is in the form of coiled strips 24" wide and $\frac{1}{16}$" thick. One-half pound of sodium oxide pellets is also placed in the bottom of the container. A stainless steel cover is placed on the container and sealed to prevent escape of gas. A vacuum pump is attached to an opening in the cover and the air is evacuated. Through another opening in the cover there is introduced a mixture of 80 volume percent 1,1-difluoroethylene and 20 volume percent dissociated ammonia.

The container and its contents are then placed in a gas-heated furnace, heated to a temperature of 1300° F. and held at this temperature for 15 minutes. The assembly is then cooled to room temperature and opened. No odor of HF is detectable and the nickel silver surface is exceptionally bright, showing no evidence of oxide formation.

Other gaseous halogenated hydrocarbons such as 1,1,1-chlorodifluoroethane, fluoroform, and 1,2-dichloro-1,1,2,2-tetrafluoroethane can be substituted for the 1,1-difluoroethylene in the above procedure with substantially equivalent results. Also, potassium oxide can be substituted for the sodium oxide.

Example 5

Into a continuous annealing furnace, maintained at 1900° F., is fed 304 stainless steel strip which is 24" wide and 0.022" thick at a speed of approximately 16' per second. Each 2 minutes two slugs weighing approximately 1⅜ oz. each and made up of approximately 30 weight percent polyhexafluoropropylene and 70 weight percent ground fused silica are dropped into the muffle chamber. At the end of a 1 hour period, 940 ft. of strip (1500') is through the annealing area and metal surface is bright and shiny.

Example 6

Ten tons of C–1020 flat rolled coil steel to be annealed is placed inside the inner cover of a box type furnace. Connected to this system is a chamber heated by a radiant heater. Into this chamber are placed four ½ # doughnut-shaped rings of the type described in Example 1.

The temperature in the separate chamber is raised to 1300° F. and maintained throughout the heat treatment. Outer radiant heaters are then placed over the inner cover and the temperature of the steel is raised to 1575° F. and held for one hour. No oxide is formed on the steel. The HF produced upon hydrolysis of the TFE decomposition products is effectively scavenged by the magnesia.

Example 7

In the stress relieving of 65–35 yellow brass at 400° F., 100 lbs. of the alloy is placed in a closed container which is connected in the same system to a polytetrafluoroethylene decomposition chamber maintained at 1200° F. One ½ # doughnut-shaped ring of the type described in Example 1 is used in the decomposition chamber.

After 15 minutes the alloy is cooled and removed from the container. No sign of zinc smut is discernible on the alloy surface and no odor of HF is noticeable upon opening the chamber.

Example 8

An aluminum bronze (86.5 Cu-11A1-2.5 Fe) strip which is 2 ft. wide and 15 mils thick is solution treated in a continuous conveyor furnace of the type shown in FIG. 2, p. 286 of Metals Handbook, vol. 2, 8th ed. (1964). Residence time in the heating zone, which is maintained at 1450° F., is 5 minutes. The atmosphere in the muffle is provided by mixing one volume of 1,1-difluoroethane with 2 volumes of dissociated, completely combusted ammonia. Hydrogen fluoride gas produced upon hydrolysis of the decomposition products of the halocarbon is removed by passing the gases as they leave the furnace through a bed of very finely divided BaO particles.

The heat treated alloy strip is completely free of surface oxides. HF concentration in the furnace off-gas is less than 100 p.p.m.

I claim:

1. In the method of controlling oxide formation on the surface of metals and metal alloys during heat treatment by conducting the treatment in a gaseous atmosphere containing the hydrogen halide decomposition products of at least one member of the group consisting of polytetrafluoroethylene, polychlorotrifluoroethylene, polyvinylidenefluoride, polyhexafluoropropylene and the copolymers of vinylidenefluoride with tetrafluoroethylene and hexafluoropropylene, the improvement which comprises scavenging said hydrogen halide gas produced by causing it to react with a scavenger material of at least one member of the group consisting of oxides, hydroxides, and carbonates of magnesium, calcium, strontium and barium, said scavenger being in the form of finely divided particles having a surface area as determined by nitrogen adsorption of at least 0.1 m.$^2$/g.

2. The improvement of claim 1 wherein the scavenger material is selected from the group consisting of the oxide of magnesium, the oxide of calcium and mixtures of said oxides, said scavenger having a surface area as determined by nitrogen adsorption of at least 2 m.$^2$/g.

3. The improvement of claim 2 wherein the metal being heat-treated is a stainless steel.

4. The improvement of claim 2 wherein the metal being heat-treated is nickel or a nickel alloy.

5. The improvement of claim 2 wherein the metal being heat-treated is magnesium or a magnesium alloy.

6. The improvement of claim 2 wherein the metal being heat-treated is titanium or a titanium alloy.

7. The improvement of claim 2 wherein the metal being heat-treated is aluminum or an aluminum alloy.

8. The improvement of claim 2 wherein the metal being heat-treated is copper or a copper alloy.

References Cited

UNITED STATES PATENTS

| | | | |
|---|---|---|---|
| 1,719,975 | 7/1929 | Gero | 148—20.3 |
| 2,092,033 | 9/1937 | Stroup | 148—20.3 |
| 2,643,961 | 6/1953 | Snyder et al. | 148—13.2 |
| 2,851,387 | 9/1958 | Low | 148—16 |
| 2,992,147 | 7/1961 | Hayes | 148—16 |
| 3,140,205 | 7/1964 | Malcolm | 148—16.7 |

RICHARD O. DEAN, Primary Examiner

U.S. Cl. X.R.

148—13.2, 14, 16, 16.7, 20.3